United States Patent

[11] 3,565,149

| [72] | Inventor | Lewis K. Wetzel |
| | | South Burlington, Vt. |
| [21] | Appl. No. | 788,405 |
| [22] | Filed | Jan. 2, 1969 |
| [45] | Patented | Feb. 23, 1971 |
| [73] | Assignee | General Electric Company |

[54] SPRING LOCK
3 Claims, 3 Drawing Figs.

[52] U.S. Cl. .................................................. 151/30;
24/29; 24/81
[51] Int. Cl. .................................................. F16b 39/20
[50] Field of Search .......................................... 151/30, 14
(CS), 27, 51, 44, 49, 50, 52, 33, 70, 41.7; 24/29,
81, 81 (CC), 81.4, 81 (B,C)

[56] References Cited
UNITED STATES PATENTS
3,467,158  9/1969  Pasbrig ........................ 151/30

| 939,124 | 11/1909 | Davies ........................ | 151/30 |
| 1,081,965 | 12/1913 | Kester ........................ | 151/30 |
| 1,172,722 | 2/1916 | Millard ........................ | 151/30 |
| 1,179,446 | 4/1916 | Mennie ........................ | 151/30 |
| 1,313,759 | 8/1919 | Taylor ........................ | 151/30 |

FOREIGN PATENTS
20,009   9/1911   Great Britain ................ 151/30

*Primary Examiner*—Ramon S. Britts
*Attorneys*—Bailin L. Kuch, Harry C. Burgess, Irving M. Freedman, Frank L. Neuhauser, Oscar B. Waddell and Melvin M. Goldenberg

ABSTRACT: A spring lock, for restraining rotational and longitudinal movement of a first element of substantially circular cross section with respect to a second element, includes a wrap-down spring clutch having a medial annular, anchor point, and two distal, similarly wound, helical springs respectively terminating in handles.

PATENTED FEB23 1971        3,565,149

INVENTOR:
LEWIS K. WETZEL,

BY
HIS ATTORNEY.

SPRING LOCK

BACKGROUND OF THE INVENTION

1. Field of the Invention

This invention relates to devices for locking one element to a second element, and particularly to wrap-down spring clutches.

2. Prior Art

Wrap-down spring clutches are well known. Generally, they consist of a helical spring which is fixed at one end thereof to a first element and which encircles and grasps a second element. Friction developed by incremental relative motion between the spring and the second element in one direction tends to cause a wrap-down of the helical spring, or decrease of its diameter, about the second element, and an interlock between the spring and the second element. Friction developed by incremental relative motion between the spring and the second element in the opposite direction tends to cause an unwrap of the helical spring, or increase of its diameter, and a relative disengagement between the spring and the second element. It will be appreciated that these clutches are unidirectional rotational interlock devices.

Bidirectional, rotational interlock devices are also well known. A cross pin locks against rotational and longitudinal relative movement, but precludes any subsequent adjustment. A key locks against rotational movement, but may permit longitudinal movement, and precludes any subsequent rotational adjustment. A setscrew locks against rotational and longitudinal relative movement, and permits subsequent adjustment; but because of the relatively small surface area of engagement between the screw and the second element, requires high pressure resulting in deformation of the surface of the second element.

SUMMARY OF THE INVENTION

It is an object of this invention to provide an adjustable interlock between first and second elements against relative rotational and longitudinal movement, and which may be repeatedly adjusted, without deformation of the surfaces of either of the elements.

A feature of this invention is a spring lock, for restraining rotational and longitudinal movement of an element of substantially circular cross section with respect to another element, which includes a tubular helical spring having a medial, annular anchor portion, and two distal, similarly wound, helical spring portions, respectively terminating in handles.

BRIEF DESCRIPTION OF THE DRAWING

These and other objects, features and advantages of the invention will be apparent from the following specification thereof, taken in conjunction with the accompanying drawing, in which.

DESCRIPTION OF THE INVENTION

Figure 1:
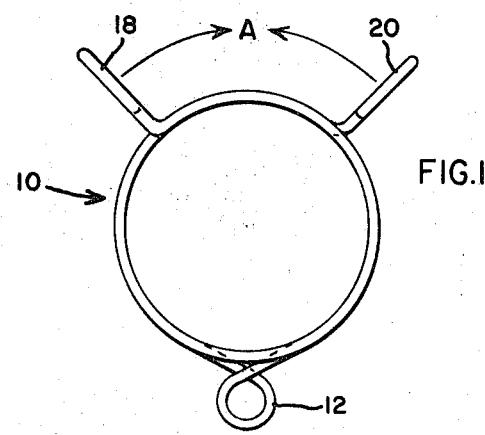
FIG. 1 is a front view in elevation of a spring embodying this invention.
Figure 2:
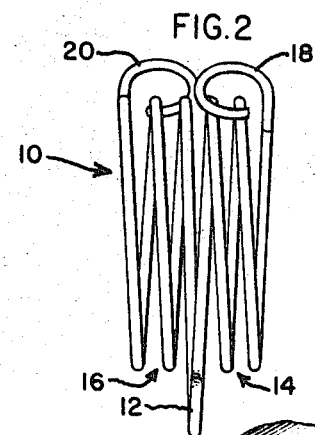
FIG. 2 is a side view in elevation of the spring of FIG. 1.

The spring lock or clutch 10 is fabricated from resilient wire. The wire is here shown as circular in cross section, but for maximum surface engagement with a cylindrical member, a rectangular cross section may be advantageously used.

The spring has a plurality of main turns wound to provide a substantially tubular structure, having an internal diameter when free of externally applied stress which is somewhat smaller than the element to be grasped, but which is adapted to be enlarged to somewhat larger under the influence of an externally applied stress, as will be described below.

The spring has a longitudinally medial reverse turn 12 which is centrifugally external to the main tubular structure and which is adapted to serve as the anchor for the spring. Two similarly wound distal portions 14 and 16 extend from the medial turn 12 in longitudinally opposite directions, and each terminates in a respective handle portion 18, 20, here shown as respective loops which are centrifugally external to the main tubular structure, and are reversely bent. Each distal portion may comprise one or more turns, and is here shown having 2½ turns. Movement of the two handle portions 18, 20 towards each other, in the direction A, will tend to unwind each respective distal portion with respect to the anchor turn 12, and to enlarge the inner diameter of the main tubular structure.

Figure 3:
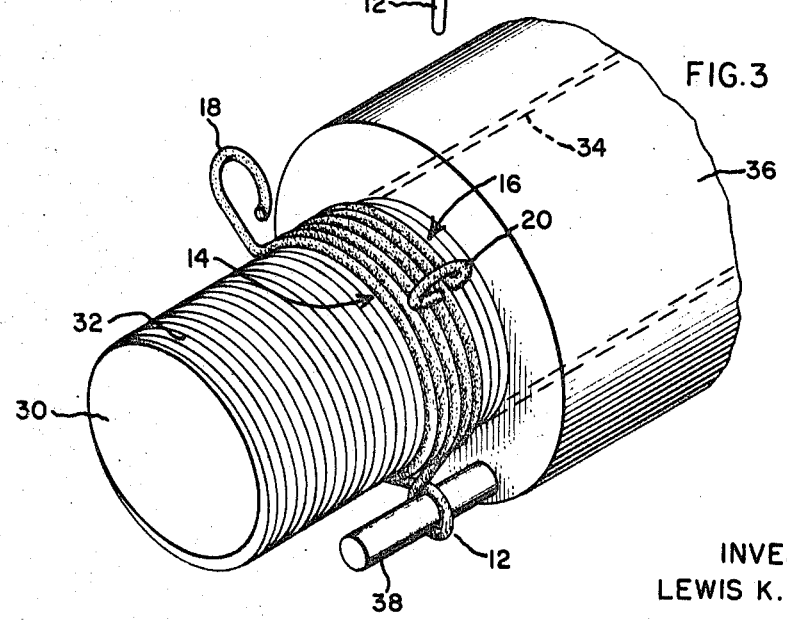
FIG. 3 is a perspective view of the spring of FIG. 1 interlocking two elements.

In an exemplary application shown in FIG. 3, a rod 30 has an externally threaded portion 32 which is mated with an internally threaded bore 34 in a housing 36. A stud 38 is fixed to the housing and extends therefrom to pass through and capture the anchor turn 12. Each of the main turns of the two distal portions 14, 16 normally lies in a respective valley of the threaded portion 32 of the rod 30 and in frictional engagement therewith. Should the rod tend to rotate in the clockwise direction, the frictional engagement of the rod with the spring will tend to wind-down one distal portion of the spring, shown in FIG. 3 as portion 16, increasing the frictional engagement and precluding such rotation. Should the rod tend to rotate in the counterclockwise direction, the distal portion 14 will similarly wrap-down and preclude rotation. For insertion or adjustment, the handles 18, 20 are squeezed together in the direction A to enlarge the inner diameter of the tubular structure to clear the rod.

The number of turns required for each distal portion will depend on the proportions of the elements and the particular spring wire used. The greater the normal arcuate distance between the handle portion 18, 20, the greater the enlargement possible of the internal diameter of the tubular structure.

If the element which is grasped by the spring is threaded into the other element, then preclusion of rotational movement of necessity precludes longitudinal movement due to the threaded interlock.

If the element which is grasped by the spring is simply journaled into the other element, it will still be found that the normal frictional stress developed by both distal portions with the element preclude longitudinal movement of the element with respect to the spring. By anchoring the anchor turn 12 of the spring a fixed distance from the other element, as by the use of two spaced apart cross pins on the stud 38, relative longitudinal movement between the two elements will be precluded.

While maximum surface engagement is obtained between a grasped element of circular cross section and a spring of circular cross section, it will be appreciated that a useful lock can be achieved with other cross sections, such as elliptical.

I claim:

1. An assembly comprising:

a first element having a bore therein;

a second element having a substantially circular cross section disposed at least in part in said bore of said first element;

a spring lock comprising:

an elongate element which is wound into a plurality of main turns to provide a substantially tubular structure;

a longitudinally medial turn which is centrifugally external to said tubular structure, and divides said tubular structure into two similarly wound, oppositely directed distal portions;

each of said distal portions terminating in a respective handle portion which is centrifugally external to said tubular structure, and at least in part coplanar with said medial turn;

said tubular structure having an internal diameter when free of externally applied stress which is somewhat smaller than the external diameter of said second element, and which internal diameter may be increased by movement of said handle portions towards each other;

means fixed to said first element and engaging said medial turn of said spring lock to capture said lock to said first element; and said second element disposed in part within and grasped by said tubular structure of said spring.

2. An assembly according to claim 1 wherein said second element is threaded into said first element and said elongate element tubular structure lies in the valley of the threads of said second element.

3. An assembly comprising:
a first member having an internally threaded bore;
a second member having an externally threaded portion threaded into said bore of said first member;
a spring lock, for concurrently restraining clockwise and counterclockwise rotation of said second member in said first member, including:
an elongate element having:
a medial turn dividing said element into a first and second portion;
said first portion being wound in a first rotational direction along a first longitudinal direction into a tubular helix from said medial turn;
said second portion being wound in said first rotational direction along a second longitudinal direction opposite to said first longitudinal direction into a tubular helix from said medial turn;
said first portion helix and said second portion helix together defining a cylinder with respect to which said medial turn is external;
each of said first and second portions terminating in a respective handle portion which is external to said cylinder, and at least in part coplanar with said medial turn, movement of said handle portions towards each other being adapted to increase the diameter of said cylinder;
the portions of said elongate element defining said cylinder lying in the valley of the threads of and resiliently engaging said second member; and
means fixed to said first member and engaging said medial turn of said spring lock to capture said lock to said first member.